(12) United States Patent  (10) Patent No.: US 10,796,019 B2
Dattatri et al.  (45) Date of Patent: Oct. 6, 2020

(54) DETECTING PERSONALLY IDENTIFIABLE INFORMATION (PII) IN TELEMETRY DATA

(71) Applicant: Dell Products L. P., Round Rock, TX (US)

(72) Inventors: Maheshwar Dattatri, Cedar Park, TX (US); Abhinav Gupta, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 275 days.

(21) Appl. No.: 16/037,079

(22) Filed: Jul. 17, 2018

(65) Prior Publication Data

US 2020/0026877 A1  Jan. 23, 2020

(51) Int. Cl.
  *H04L 29/06* (2006.01)
  *G06F 21/62* (2013.01)
  *G06N 20/00* (2019.01)

(52) U.S. Cl.
  CPC ......... *G06F 21/6254* (2013.01); *G06N 20/00* (2019.01)

(58) Field of Classification Search
  None
  See application file for complete search history.

(56) References Cited

U.S. PATENT DOCUMENTS

| 2005/0091269 | A1* | 4/2005 | Gerber | G06F 9/44505 |
| 2006/0002532 | A1* | 1/2006 | Horvitz | H04M 3/42365 |
|  |  |  |  | 379/112.01 |
| 2014/0297268 | A1* | 10/2014 | Govrin | G06N 5/04 |
|  |  |  |  | 704/9 |
| 2015/0319185 | A1* | 11/2015 | Kirti | H04L 67/306 |
|  |  |  |  | 726/23 |
| 2018/0033009 | A1* | 2/2018 | Goldman | G06Q 40/10 |
| 2018/0157830 | A1* | 6/2018 | Siebert | G06F 21/54 |
| 2018/0288074 | A1* | 10/2018 | Thayer | H04L 63/145 |

(Continued)

OTHER PUBLICATIONS

Patil, Akshay et al. Modeling Attrition in Organizations from Email Communication. 2013 International Conference on Social Computing. https://ieeexplore.ieee.org/stamp/stamp.jsp?tp=&arnumber=6693349 (Year: 2013).*

(Continued)

*Primary Examiner* — Jeremiah L Avery
(74) *Attorney, Agent, or Firm* — Campbell Stephenson LLP; Shiv S. Naimpally (57) ABSTRACT

In some examples, a computing device may determine that an event occurred and determine event data associated with the event. A first machine learning classifier may be used to determine that the event data includes personally identifiable information (PII) and a second machine learning classifier may be used to remove the PII from the event data to create modified event data. The PII may include one or more of a username, a password, at least a portion of a legal name, a password, at least a portion of an address, at least a portion of a social security number, or at least a portion of an account number associated with a financial institution. The modified event data may be stored in a device data file that includes data associated with the computing device. In some cases, the computing device may send the device data file to a server.

20 Claims, 4 Drawing Sheets

(56) References Cited

U.S. PATENT DOCUMENTS

2018/0375886 A1* 12/2018 Kirti ................... H04L 63/1416
2019/0068627 A1* 2/2019 Thampy ................ H04W 12/12

OTHER PUBLICATIONS

Oliver, Ian. Experiences in the Development and Usage of a Privacy Requirements Framework. 2016 IEEE 24th International Requirements Engineering Conference (RE). https://ieeexplore.ieee.org/stamp/stamp.jsp?tp=&arnumber=7765535 (Year: 2016).*

Hiller, Janine S. Legal aspects of a cyber immune system. 2013 5th International Conference on Cyber Conflict (CYCON 2013). https://ieeexplore.ieee.org/stamp/stamp.jsp?tp=&arnumber=6568382 (Year: 2013).*

* cited by examiner

DETECTING PERSONALLY IDENTIFIABLE INFORMATION (PII) IN TELEMETRY DATA

BACKGROUND OF THE INVENTION

Field of the Invention

This invention relates generally to computing devices and, more particularly to detecting personally identifiable information (PII) in telemetry data sent by a computing device to a server (or cloud-based environment).

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A manufacturer of computing devices, such as desktops, laptops, and tablets, may gather data about how each of the computing devices are being used. For example, the manufacturer may install a software agent on each computing device that gathers the data and sends the data (e.g., telemetry data) to servers associated with the manufacturer. In some cases, the data that is gathered may include personally identifiable information (PII), e.g., any portion of the data that may potentially be used to identify a particular individual. Receiving PII may create legal liability and other issues for the manufacturer.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device may determine that an event occurred and determine event data associated with the event. A first machine learning classifier may be used to determine that the event data includes personally identifiable information (PII) and a second machine learning classifier may be used to remove the PII from the event data to create modified event data. The PII may include one or more of a username, a password, at least a portion of a legal name, a password, at least a portion of an address, at least a portion of a social security number, or at least a portion of an account number associated with a financial institution. The modified event data may be stored in a device data file that includes data associated with the computing device. In some cases, the computing device may send the device data file to a server.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein enable detecting personally identifiable information (PII) in telemetry data that is being sent from a computing device to a server (or cloud-based environment). PII includes any type of data that can be used to identify one or more users of the computing device.

A manufacturer may gather data as to how users are using a computing device made by the manufacturer. For example, the manufacturer may install software, such as a software agent, on each computing device that is manufactured before each computing device is shipped to a customer. The software agent may gather data, such as event-related data, such as interactions between a user and a user interface (e.g., dialog box selections, user entering information such as legal name, username, password, telephone number, address, account number, and the like), whether any software applications have encountered issues (e.g., crash), how often the issues have occurred, software application installation logs, data related to operating system (O/S) restarts, how often the O/S restarts occur, whether the restarts are user-initiated or initiated by the O/S, O/S memory dumps, and the like. The data may include software applications that are currently installed on the computing device, which software applications are used, how they are used, when they are used, which hardware components the software applications use, and the like. The data may include peripheral devices that have been connected to the computing device, when they are used, how long they are used, and the like.

The gathered data may include PII, e.g., data that can be used to identify one or more users of the computing device. For example, the PII may include usernames, passwords, email addresses, telephone numbers, physical addresses (e.g., home address, work address, and the like), and other similar information. The PII may be detected and removed (1) by the computing device (e.g., prior to sending the data to a server), (2) by the server (e.g., after the server receives the PII), or (3) by a combination of both the computing device and the server. Conventional systems may use static pattern matching to identify PII. However, conventional systems are unable to detect PII when the PII is not in a pre-defined format. For example, a conventional pattern matching system may be unable to detect a telephone number expressed as, for example, "One 800 one two three 456 seven".

The systems and techniques described herein may detect (and remove) PII using one or more machine learning algorithms (e.g., classifiers). For example, a PII detector may use Naïve Bayes or a similar type of machine learning classifier to determine, using a custom dictionary, whether the data includes PII. If the custom dictionary is located on a computing device, the server may periodically (e.g., every month, every quarter, every six months, or the like) send the computing device an updated dictionary. If the custom dictionary is located on a server, the server may update the custom dictionary when new items are to be added (e.g., in real-time) to the dictionary. A second machine learning algorithm, a PII remover, may use a decision trees or similar type of classifier to remove and/or replace the PII with a descriptor. For example, the PII remover may replace a phone number with "<number>", replace a user id with "<username>", and the like.

The PII remover on the computing device may, in some cases, perform a simple replacement, such as, for example, replacing each numeric value with "0" (zero), "*", or the like, and replacing alphabetic characters with "A", "-", "*", or the like. For example, the PII remover may replace a telephone number "(123) 456-7890" with "(000) 000-0000". As another example, the PII remover may replace a user name "john_doe" with "aaaa_aaa", "**_*", "----_---", or the like. The PII remover may replace an email address "john_doe@domain.com" with "aaaa_aaa@aaaaaa.aaa", "**_*@****.*", "----_---@------.---", or the like. After the data is sent to the server, the PII remover on the server may replace a telephone number (e.g., "(000) 000-0000" or the like) with a descriptor (e.g., "<number>, <telephone number>, or the like), replace a user name (e.g., "aaaa_aaa" or the like) with a descriptor (e.g., <username> or the like), replace an email address (e.g., "aaaa_aaa@aaaaaa.aaa" or the like) with a descriptor (e.g., <email address>, or the like), and so on.

In some cases, the PII detector and PII remover on the computing device may not be used. For example, in cases where the connection between the computing device and the server has sufficient bandwidth to handle the traffic created by periodically sending the gathered data to the server, the PII detector and PII remover on the server may be used to detect and remove PII. In this situation, the PII detector and PII remover on the computing device may not be used or only a portion of their functionality may be used.

In cases where the connection between the computing device and the server has insufficient bandwidth (e.g., the connection is poor or is down due to networking issues) or the server is receiving too much data (e.g., the rate at which data is being received is greater than the rate at which the server can process the data), the PII detector and PII remover on the computing device may be activated and may be used to detect and replace PII in the gathered data until (i) the connection has sufficient bandwidth to send the gathered data from the computing device to the server or (ii) the server is capable of processing the data (e.g., the rate at which the server can process data is greater than or equal to the rate at which the data is being received). In such situations, the PII detector and PII remover on the server may not be used.

As an example, a computing device may include computer readable storage media storing instructions executable by one or more processors to perform various operations. For example, the operations may include determining that an event occurred on the computing device and determining event data associated with the event. A first machine learning classifier (e.g., a Naïve Bayes classifier) that is being executed by the computing device may be used to determine that the event data includes PII. A second machine learning classifier (e.g., a Decision Trees classifier) that is being executed by the computing device may remove the PII from the event data to create modified event data. The modified event data may be stored in a device data file that includes data associated with the computing device. The computing device may send the device data file to a server. The event may include one or more of: input provided by a user (e.g., during login to the computing device or to a website, dialog box selections in a user interface, and the like), a software application installation log, a software application created log, an operating system log, or an operating system memory dump. Removing the personally identifiable information from the event data to create the modified event data may include substituting a first pre-determined character (e.g., "*", "-", "a", "x", or the like) for each alphabetic character in the personally identifiable information and substituting a second pre-determined character (e.g., "0", "1", "9", or the like) for each numeric character in the personally identifiable information. In some cases, removing the personally identifiable information from the event data to create the modified event data may include identifying a type of the personally identifiable information and substituting one or more keywords describing the type. For example, the type may include one of: a username, a password, at least a portion of a legal name, at least a portion of an address, at least a portion of a social security number, or at least a portion of an account number associated with a financial institution. The operations may include determining that a second event occurred on the computing device and determining second event data associated with the second event. The operations may include determining, using the first machine learning classifier, that the second event data includes the PII and removing, using the second machine learning classifier, the personally identifiable information from the second event data to create modified second event data and storing the modified second event data in the device data file. The operations may include determining that the modified second event data is not to be sent to the server. For example, the computing device may determine that a network connection between the computing device and the server is unavailable and determine not to send the device data file to the server. As another example, the computing device may receive a first instruction from the server to temporarily stop sending the device data file to the server. At a later point in time, the computing device may receive a second instruction from the server to resume sending the device data file to the server.

Figure 1:
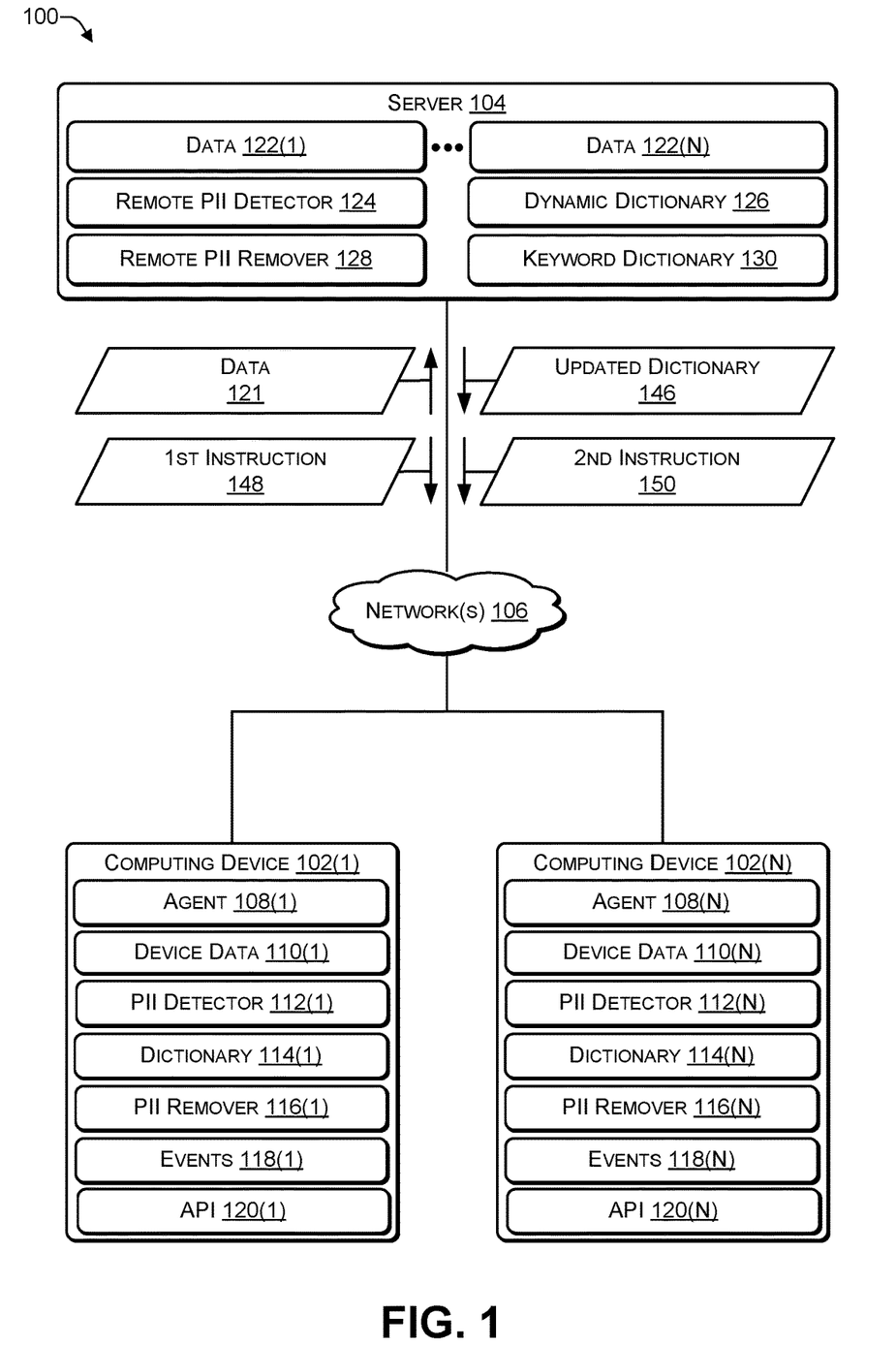
FIG. 1 is a block diagram of a system that includes a computing device sending telemetry data to a server, according to some embodiments.

FIG. 1 is a block diagram of a system 100 that includes a computing device sending telemetry data to a server, according to some embodiments. The system 100 may include multiple computing devices 102 coupled to a server 104 via one or more networks 106. For example, the computing devices 102 may include a computing device 102(1) to computing device 102(N) (where N is greater than 0). The computing devices 102 may include a laptop, a tablet, a desktop, a smart phone, or another type of computing device.

Each of the computing devices 102 may include an agent 108, device data 110, a PII detector 112, a dictionary 114, a PII remover 116, events 118, and an application programming interface (API) 120. For example, the computing device 102(1) may include an agent 108(1), device data 110(1), a PII detector 112(1), a dictionary 114(1), a PII remover 116(1), events 118(1), and an API 120(1). The computing device 102(N) may include an agent 108(N), device data 110(N), a PII detector 112(N), a dictionary 114(N), a PII remover 116(N), events 118(N), and an API 120(N).

Each of the agents 108 may gather the corresponding device data 110 associated with the corresponding computing device 102 and send the device data 110 to the server 104 via the network 106. For example, the agent 108(N) may gather the device data 110(N) associated with the computing device 102(N) and send the device data 110(N) to the server 104. The device data 110 may include one or more events 118 that have occurred on the corresponding computing device 102. For example, the events 118 may include (i) information associated with a software application or operating system crash, (ii) logs generated by the software applications (e.g., installation logs, error logs, crash logs and the like), (iii) memory dumps created by software applications or by an operating system of the computing device, (iv) how many restarts occurred, whether the restarts were manually initiated, initiated by a particular software application, or initiated by the operating system of the computing device 102, (v) interaction data associated with interactions between a user and the computing device 102, such as, for example, user-selected dialog boxes in a user interface, reviews left on a site, and other interactions, and (vi) other types of events. The device data 110 may be gathered at a predetermined time interval, in response to detecting a particular event (e.g., operating system restart), in response to detecting a particular set of events (e.g., multiple error logs from different software applications, or a particular type of log), in response to detecting another type of event, or any combination thereof.

Each of the computing devices 102 may include the PII detector 112 and the dictionary 114. For example, the computing device 102(N) may include the PII detector 112(N) that determines whether the device data 110(N) includes PII using the dictionary 114(N). The PII may be information that can be used by itself or in conjunction with other information to identify, contact, or locate one or more users of the corresponding computing device 102. For example, the PII may include phone numbers, email addresses, physical (e.g., home or business) addresses, credit card or other financial information (e.g., digits of an account number, personal identification number (PIN) number, and the like), and other information that could enable identification of personal information associated with users of each of the computing devices 102. The dictionary 114 may include phrases that the manufacturer of the computing devices 102 knows are likely to contain or are associated with PII, such as "user", "username", "password", and the like. For example, the manufacturer may know the phrases associated with PII and the format used to store various types of PII and add the phrases and formats to the dictionary 114.

After the PII detector 112 determines that the device data 110 includes PII, the PII remover 116 may remove the PII from the device data 110. In some cases, the PII remover 116 may replace the PII in the device data 110 with generic data. For example, in the device data 110, the PII remover 116 may replace a phone number with "<number>", replace a user id with "<username>", and the like. The PII remover 116 may, in some cases, perform a simple replacement, such as, for example, replacing each numeric value with "0" (zero), "*", or the like, and replacing alphabetic characters with "A", "-", "*", or the like. For example, the PII remover 116 may replace a telephone number "(123) 456-7890" with "(000) 000-0000". As another example, the PII remover 116 may replace a user name "john_doe" with "aaaa_aaa", "**_*", "____ ___", or the like. The PII remover 116 may replace an email address "john_doe@domain.com" with "aaaa_aaa@aaaaaa.aaa", "**_*@****.*", "____ ___@------.---", or the like.

Each of the computing devices 102 may gather the device data 110 (including the events 118). A particular computing device, such as one of the computing devices 102(1) to 102(N), may send data 121 (e.g., telemetry data) to the server 104. For example, the data 121 may be one of the device data 110(1) to 110(N). The PII detector 112 may analyze the data 121 and the PII remover may remove the PII from the data 121 before the data 121 is sent to the server 104. In some cases, the agents 108 may send the device data 110 to the server 104 using a call to an application programming interface (API) 120. For example, the agent 108(N) may send the device data 110(N) to the server 104 by calling the API 120(N).

The server 104 may receive the data 121 from one of the computing devices 102, remove and replace PII in the data 121, and store the data 121 as one of the data (units) 122(1) to 122(N). The server 104 may include a remote PII detector 124 that uses a dynamically updated dictionary 126. The dynamically updated dictionary 126 may be frequently updated (e.g., every day or multiple times each day) to add new words or delete words that are no longer useful. In contrast, the dictionary 114 located on each of the computing devices 102 may be updated less frequently, such as, for example, every month, every quarter, every six months, or the like. The remote PII detector 124 may have more computing resources (e.g., CPU cycles, memory, algorithms, and the like) as compared to one of the PII detectors 112 and may therefore perform a longer and deeper analysis of the data 121 to identify PII. In contrast, the PII detector 112 may run as a background (e.g., low priority) process on the computing devices 102 and may perform a relatively fast and quick scan for PII to avoid significantly slowing down the primary activities being performed on the computing devices 102. The PII remote detector 124 may determine whether the data 121 includes PII using the dynamically updated dictionary 126. The PII may be information that can be used by itself or in conjunction with other information to identify, contact, or locate one or more users of the corresponding computing device 102. The dynamically updated dictionary 126 may include phrases that the manufacturer of the computing devices 102 knows are likely to contain or are associated with PII, such as "user", "username", "password", and the like. For example, the manufacturer may know the phrases associated with PII and the format used to store various types of PII and may perform regular updates to add the phrases and formats to the dictionary 126.

After the remote PII detector 124 determines that the data 121 includes PII, the remote PII remover 128 may remove the PII from the data 121. The remote PII remover 128 may replace the PII in the data 121 with a word or a phrase from a keyword dictionary 130. For example, a username (e.g., "john_smith") may be replaced with a generic word or phrase, e.g., <username>. As another example, a phone number (e.g., "1-800-555-1212") may be replaced with a generic word or phrase, e.g., <phone number>. As yet another example, an account number (e.g., "1234-4567-8901") may be replaced with a generic word or phrase, e.g., <account number>.

The server 104 may create an updated dictionary 146 (to replace the dictionary 114) and send the updated dictionary 146 to one or more of the computing devices 102 at a periodic interval (e.g., every month, every quarter, every six months), or when an update is to be performed (e.g., an error is detected). For example, if an error or bug is causing PII to slip through, then the server 104 may push the updated dictionary 146 to each of the computing devices 102.

Thus, each of the computing devices 102 may have the agent 108 that gathers information (e.g., device data 110) about events occurring on the corresponding one of the computing devices 102. In some cases, the agent 108 may gather additional information, such as, for example, the software configuration, the hardware configuration, and peripherals associated with the computing device 102 and how the software applications, hardware components, and peripherals are being used. After the agent 108 has gathered the device data 110, the agent 108 may use the PII detector 112 and the PII remover 116 to remove portions of the device data 110 that potentially include PII, e.g., information that could potentially be used to identify a user of each of the computing devices 108. For example, the PII detector 112 and the PII remover 116 may remove information that may include or that may be used to determine a user name, a legal name, a password, a personal identification numbers (PIN) code, a telephone number, a street address, credit card information, insurance information, account information associated with a financial institution, social security information, or other confidential information.

After the PII has been removed from the device data 110, the agent 108 may send the data 121, e.g., one of the device data 110(1) to 110(N), to the server 104. The server 104 may perform additional PII detection using the remote PII detector 124 and remove the additional PII using the remote PII remover 128. The server 104 may dynamically update one or more dictionaries used by the PII detectors 112, 124 and/or the PII removers 116, 128 and send the updated dictionary 146 to individual ones of the computing devices 102. In this way, new words, phrases, and formats may be added to the updated dictionary 146.

Various combinations of the PII detectors 112, 124 and the PII removers 116, 128 may be used. For example, in cases where the connection to the network 106 between the computing devices 102 and the server 104 has sufficient bandwidth to handle the traffic created by periodically sending the gathered data 121 from multiple computing devices 102(1) to 102(N) to the server, the PII detector 124 and the remote PII remover 128 may be used to detect and remove PII from the data 121, which is then stored as one of the data 122(1) to data 122(N). In this situation, the PII detector 112 and the PII remover 116 may not be used or only a portion of their functionality may be used. In cases where the network 106 has insufficient bandwidth (e.g., the connection is intermittent or is down due to networking issues) or the server 104 is receiving too much data (e.g., the rate at which the data 121 is being received is greater than the rate at which the server 102 can process the data 121), the PII detector 112 and the PII remover 116 may be activated and may be used to detect and replace PII in the device data 110 until (i) the connection with the network 106 has sufficient bandwidth to send the gathered device data 110 from one of the computing devices 102 to the server 102 or (ii) the server 104 is capable of processing the device data 110 (e.g., the rate at which the server 104 can process the data 121 is greater than or equal to the rate at which the data 121 is being received). In such situations, the remote PII detector 124 and the remote PII remover 128 may not be used. In still other cases, the PII detector 112 and the PII remover 116 may do a basic removal of PII from the device data 110 using a relatively small amount of computing resources such that a user is not aware that the PII detector 112 and the PII remover 116 are running in the background, e.g., the user does not perceive any impact on software applications (or other tasks that the user has initiated) executing on the computing device 102. The server 104 may perform a more sophisticated and deeper scan of the data 121 received from the computing devices 102 to further identify and remove PII.

In some cases, such as when the server 104 is unable to process the device data 110 being sent by the multiple computing devices 102 (e.g., the rate at which the server 104 can process the device data 110 is less than the rate at which the data is being received), the server 104 may send a first instruction 148 to one or more of the computing devices 102 instructing the corresponding ones of the computing devices 102 to temporarily stop sending the device data 110. In some cases, the first instruction 148 may be sent to those computing devices that are generating a large amount of the device data 110. At a later point in time, e.g., when the server 104 has caught up and is capable of processing the device data 110(N), the server 104 may send a second instruction 150 to one or more of the computing devices 102 to resume sending the device data 110. For example, if the computing device 102(N) is generating 10 times the amount of data as the average amount of data generated by each of the other computing devices (e.g., 102(1) to 102(N-1)), then the server 104 may send the first instruction 148 to the computing device 102(N) to temporarily stop sending the device data 110(N). Later, after the server 104 has processed device data received from the other computing devices, the server 104 may send the second instruction 150 to the computing device 102(N) to resume sending the device data 110(N).

Machine learning algorithms (e.g., classifiers) may be used to identify and replace PII in the gathered data. For example, the PII detectors 112, 124 may use a Naïve Bayes (or similar) classification model which identifies if the events 120 include PII based on the custom dictionary 114. The PII removers 116, 128 may use a decision trees machine learning model (or similar) to remove the PII and replace the PII with a keyword (e.g., replace 000-000-0000 with <phone number>). A relatively static version, e.g., the PII detector 112 and the PII remover 114, may be deployed on each of the computing devices 102 to enable PII filtering to be performed happens at the device level. A dynamically update version, e.g., the remote PII detector 124 and the remote PII remover 128, may be executed in the cloud (e.g., on the server 104). Thus, sensitive information can be removed from the data that is gathered by ach agent. Note that some features of the classifier models 112, 116, 124, 128 may be customized per region. For example, specific classifier models and dictionaries may be created for Latin countries (e.g., in which Spanish or Portuguese is spoken), and the like.

Figure 2:
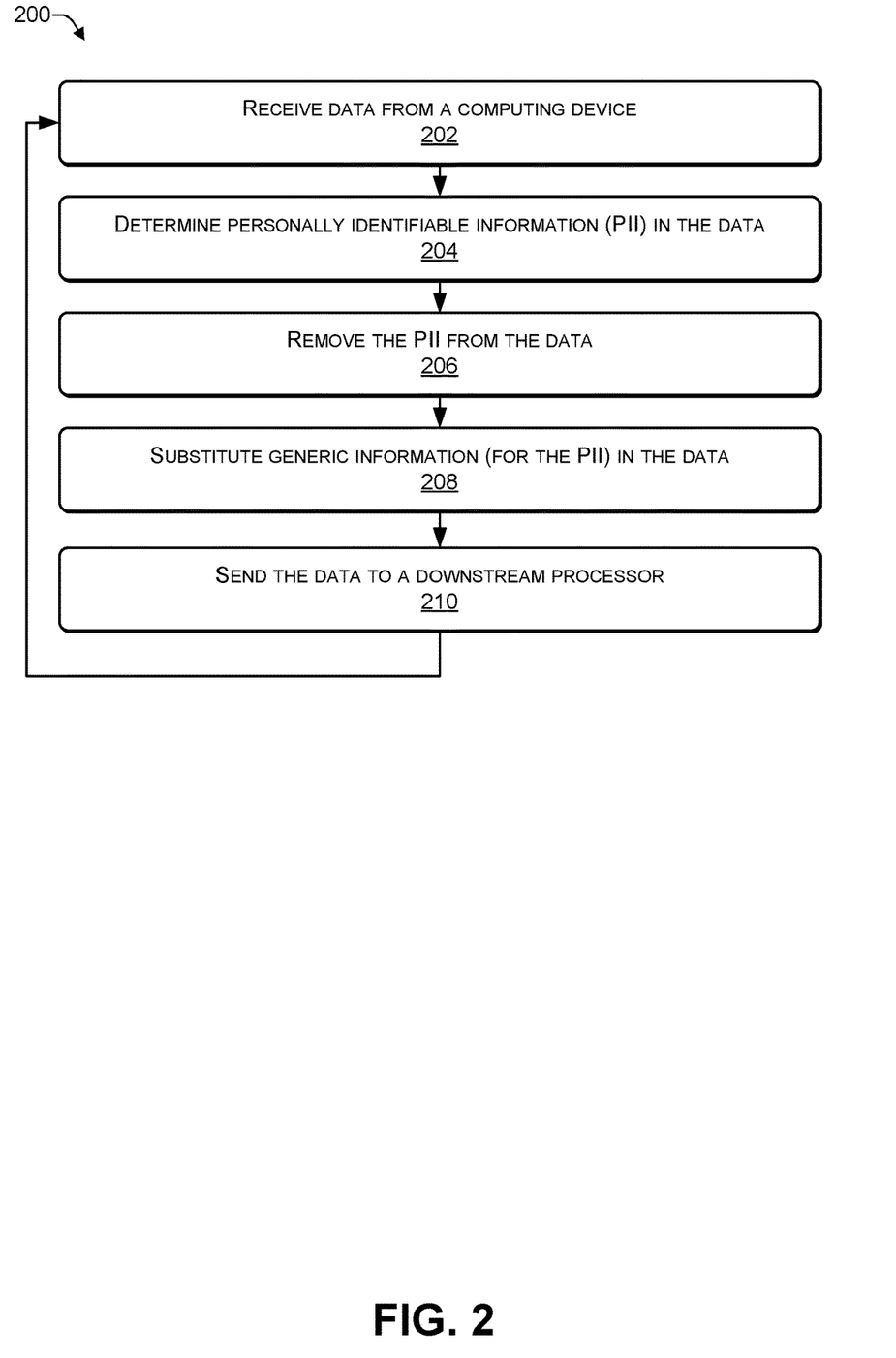
FIG. 2 is a flowchart of a process that includes determining, at a server, PII in telemetry data according to some embodiments.
Figure 3:
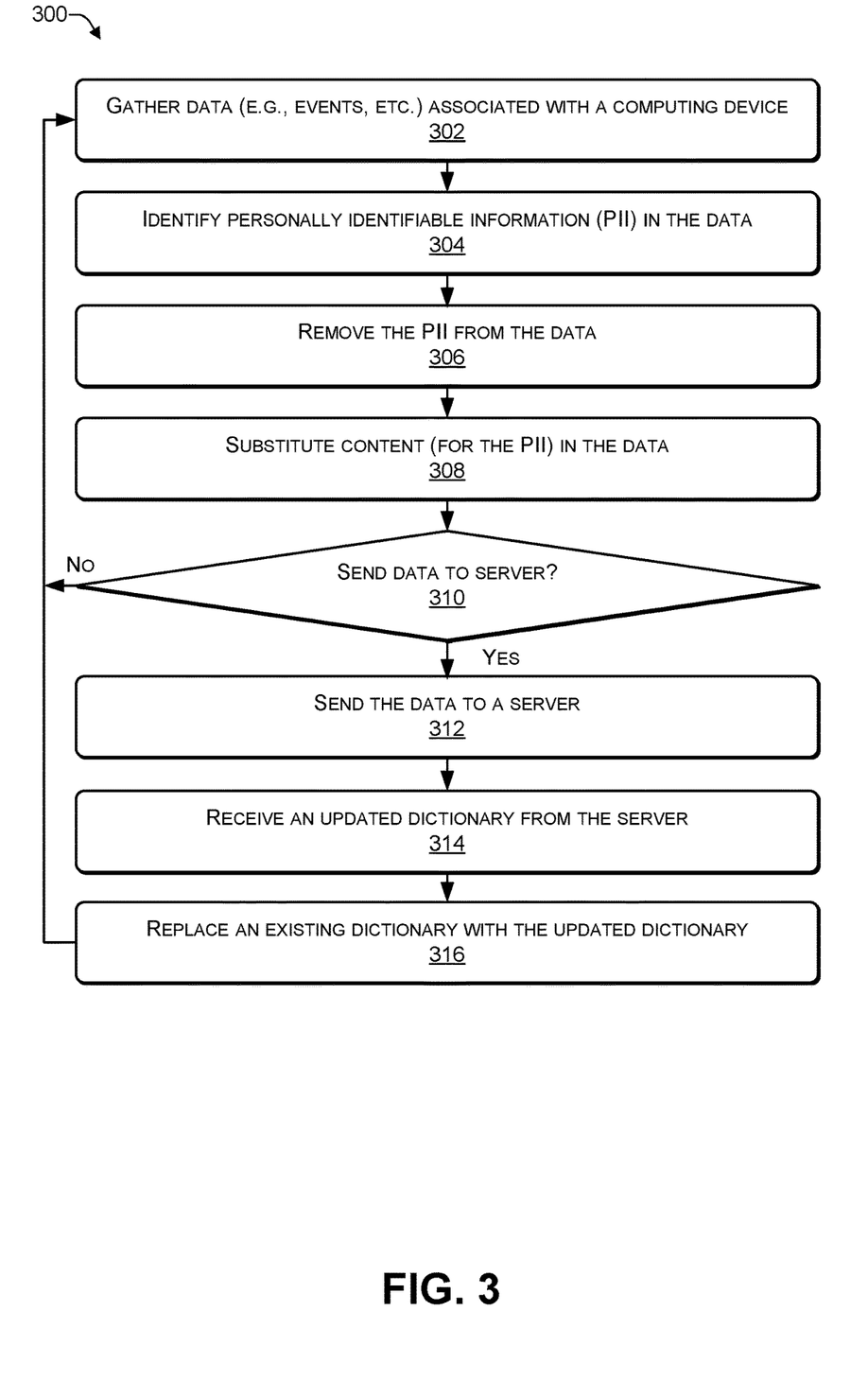
FIG. 3 is a flowchart of a process that includes determining, at a computing device, PII in telemetry data according to some embodiments.

In the flow diagrams of FIG. 2 and FIG. 3, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 200 and 300 are described with reference to FIG. 1, as described above, although other models, frameworks, systems and environments may be used to implement this process.

FIG. 2 is a flowchart of a process 200 that includes determining, at a server, PII in telemetry data according to some embodiments. The process 200 may be performed by a cloud-based processing environment, such as, for example, the server 104 of FIG. 1.

At 202, data may be received from a computing device. At 204, a determination may be made whether the data includes PII. At 206, the PII may be removed from the data. At 208, generic information may be substituted for the PII. At 210, the data may be sent to a downstream processor, and the process may proceed to 202, where additional data may be received from the same computing device or another computing device. For example, in FIG. 1, the remote PII detector 124 may determine whether the data 121 includes PII using the dynamic dictionary 126. The PII may be information that can be used by itself or in conjunction with other information to identify, contact, or locate one or more users of the corresponding computing device 102. For example, the PII may include phone numbers, email addresses, physical (e.g., home or business) addresses, credit card or other financial information (e.g., digits of an account number, personal identification number (PIN) number, and the like), and other information that could enable identification of personal information associated with users of each of the computing devices 102. The dictionary 114 may include phrases that the manufacturer of the computing devices 102 knows are likely to contain or are associated with PII, such as "user", "username", "password", and the like. For example, the manufacturer may know the phrases associated with PII and the format used to store various types of PII and add the phrases and formats to the dictionary 114. After the remote PII detector 124 determines that the data 121 includes PII, the remote PII remover 128 may remove the PII from the data 121. In some cases, the remote PII remover 128 may replace the PII in the data 121 with generic data or with a descriptor. For example, in the data 121, the remote PII remover 128 may replace a phone number with "<number>", replace a user id with "<username>", and the like. The remote PII remover 128 may, in some cases, perform a simple replacement, such as, for example, replacing each numeric value with "0" (zero), "*", or the like, and replacing alphabetic characters with "A", "-", "*", or the like. For example, the remote PII remover 128 may replace a telephone number "(123) 456-7890" with "(000) 000-0000". As another example, the remote PII remover 128 may replace a user name "john_doe" with "aaaa_aaa", "**_*", "____\_\_\_\_", or the like. The remote PII remover 128 may replace an email address "john_doe@domain.com" with "aaaa_aaa@aaaaaa.aaa", "**_*@****.*", "____\_\_\_@\_\_\_\_\_\_\_\_\_", or the like. After removing PII from the data, the data may be sent to downstream processing for analysis. For example, the manufacturer may determine which software applications, hardware components, and peripheral devices of each computing device are being used, which are not being used, how frequently they are being used, and the like. The manufacturer may use this information to make customized offers to individual users, e.g., "Based on your usage of <application>, we recommend this input controller."

Thus, a manufacturer may install an agent on each computing device prior to shipping the device. The agent may gather data about the computing device on which it is installed, including software usage, hardware component usage, peripheral usage, and events. The events may include installation logs, software (e.g., application and operating system) crashes, interactions between a user and a user interface dialog box, and the like. The agent may send the gathered data to a server. The server may use a first machine learning classifier to detect PII and a second machine learning classifier to replace the PII with a generic keyword. The data may subsequently be processed by downstream applications to identify potential offers to present to the user. For example, the manufacturer may instruct the agent to present a customized offer to the user to acquire (e.g., purchase or lease) additional software, hardware, and/or peripherals based on an analysis of the data (e.g., that was sent by the agent to the server). The user's response to the offer may be recorded by the agent as an event, e.g., "User selected 'yes' to offer to purchase input controller" or "User selected 'no" to offer to purchase input controller." This event, e.g., the user's response to the offer, may be included in the data that is sent to the server, enabling the manufacturer to make additional offers based on this information.

FIG. 3 is a flowchart of a process 300 that includes determining, at a computing device, PII in telemetry data according to some embodiments. The process 300 may be performed by one or more software components executing on the individual computing devices 102 of FIG. 1.

At 302, data associated with a computing device may be gathered. For example, in FIG. 1, each of the agents 108 may gather the device data 110 associated with the corresponding computing device 102. The device data 110 may include the events 118, software application usage, hardware component usage, and peripheral device usage.

At 304, a PII in the data may be identified. At 306, the PII may be removed from the data. At 308, substitute content for the PII may be added to the data, and the process may proceed to 302 to gather additional data. For example, in FIG. 1, the PII detector 112 may use the dictionary 114 to identify PII. The PII remover 116 may remove the PII and substitute a generic alphanumeric character. For example, in the device data 110, the PII remover 116 may, in some cases, perform a simple replacement, such as, for example, replacing each numeric value with "0" (zero), "\*", or the like, and replacing alphabetic characters with "A", "-", "\*", or the like. For example, the PII remover 116 may replace a telephone number "(123) 456-7890" with "(000) 000-0000". As another example, the PII remover 116 may replace a user name "john_doe" with "aaaa_aaa", "\*\*\*\*_\*\*\*", "----_---", or the like. The PII remover 116 may replace an email address "john_doe@domain.com" with "aaaa_aaa@aaaaaa.aaa", "\*\*\*\*_\*\*\*@\*\*\*\*\*\*_\*\*\*", "----_---", or the like.

At 310, a determination may be made whether to send the data to a server. If a "no" determination is made, at 310, e.g., the data may not to be sent to the server (at this time but may be stored and sent to the server at a later time), then the process may proceed to 302, to gather additional data associated with the computing device. If a "yes" determination is made, at 310, e.g., the data is to be sent to the server, then the process may proceed to 312, where the data (from which PII has been removed) is sent to the server. For example, in cases where (1) the connection to the network 106 between the computing devices 102 and the server 104 has sufficient bandwidth to handle the traffic created by periodically sending the device data 110 from multiple computing devices 102(1) to 102(N) to the server, or (2) the server is able to process the device data 110 being sent by the multiple computing devices 102, the device data 110 may be sent to the server 104. In such cases, the PII detector 124 and the remote PII remover 128 may be used to detect and remove PII from the data 121, which may then be stored as one of the data 122(1) to data 122(N).

In cases where the network 106 has insufficient bandwidth (e.g., the connection is intermittent or is down due to networking issues) or the server 104 is receiving too much data (e.g., the rate at which the data 121 is being received is greater than the rate at which the server 102 can process the data 121), the device data 110 may temporarily (e.g., until the network 106 or the server 104 is capable of handling the device data 110) not be sent to the server 104. In such cases, the PII detector 112 and the PII remover 116 may be activated and may be used to detect and replace PII in the device data 110 until (i) the connection with the network 106 has sufficient bandwidth to send the gathered device data 110 from one of the computing devices 102 to the server 102 or (ii) the server 104 is capable of processing the device data 110 (e.g., the rate at which the server 104 can process the data 121 is greater than or equal to the rate at which the data 121 is being received). In such situations, the PII detector 112 and the PII remover 116 may do a basic removal of PII from the device data 110 using a relatively small amount of computing resources such that a user is not aware that the PII detector 112 and the PII remover 116 are running in the background, e.g., the user does not perceive any impact on software applications (or other tasks that the user has initiated) executing on the computing device 102.

At 312, the data may be sent to the server. For example, in FIG. 1, each of the agents 108 may send the device data 110, as the data 121, to the server 104. The data 110 may be sent at a periodic time interval (e.g., every hour, every day, every week, and the like), in response to the agent 108 detecting a particular event or set of events (e.g., multiple application crashes or multiple operating system logs or restarts), or when the size of the device 110 is a predetermined size (e.g., 1 gigabyte (GB) or the like).

At 314, an updated dictionary may be received from the server. At 316, an existing dictionary may be replaced by the updated dictionary. For example, in FIG. 1, the server 104 may update a dictionary to create the updated dictionary 146 and send the updated dictionary 146 to one or more of the computing devices 102.

Thus, a manufacturer may install an agent on each computing device prior to shipping the device. The agent may gather data about the computing device on which it is installed, including software usage, hardware component usage, peripheral usage, and events. The events may include installation logs, software (e.g., application and operating system) crashes, interactions between a user and a user interface dialog box, and the like. In situations where the network or the server is not able to accommodate the agent send the gathered data to the server, the agent may process the data to remove PII. If the network and the server are both able to handle the traffic created by sending the gathered data, the agent may send the gathered data to a server. Each computing device may use a first machine learning classifier to detect PII and a second machine learning classifier to replace the PII with a generic keyword.

Figure 4:
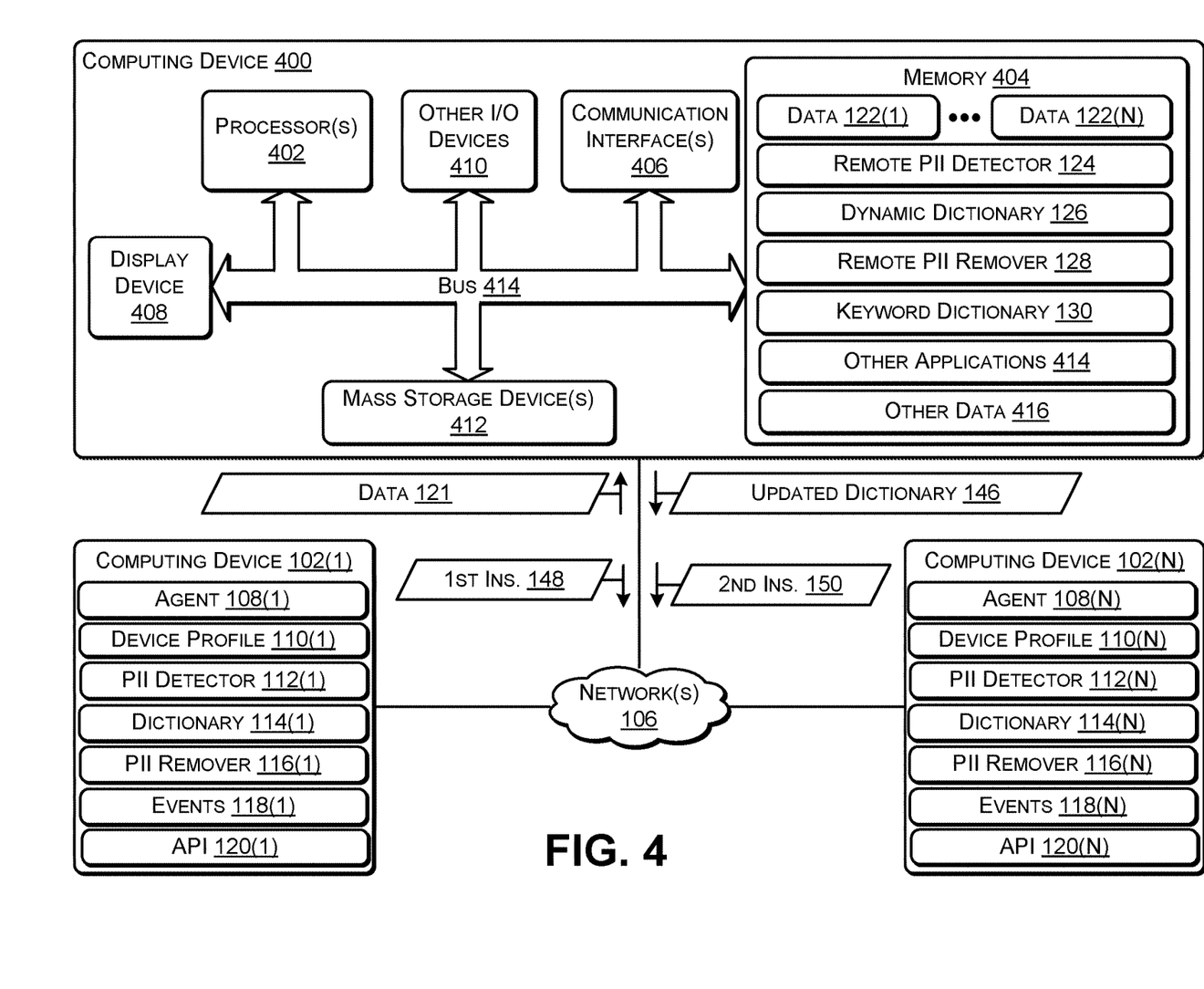
FIG. 4 illustrates an example configuration of a computing device that can be used to implement the systems and techniques described herein.

FIG. 4 illustrates an example configuration of a computing device 400 that can be used to implement the systems and techniques described herein, such as for example, the computing devices 102 and the server 104 of FIG. 1. For illustration purposes, the computing device 400 is illustrated in FIG. 4 as implementing the server 104 of FIG. 1.

The computing device 100 may include one or more processors 402 (e.g., CPU, GPU, or the like), a memory 404, communication interfaces 406, a display device 408, other input/output (I/O) devices 410 (e.g., keyboard, trackball, and the like), the sensors 206, and one or more mass storage devices 412 (e.g., disk drive, solid state disk drive, or the like), configured to communicate with each other, such as via one or more system buses 414 or other suitable connections. While a single system bus 414 is illustrated for ease of understanding, it should be understood that the system buses 414 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 402 are one or more hardware devices that may include a single processing unit or a number of processing units, all of which may include single or multiple computing units or multiple cores. The processors 402 may include a graphics processing unit (GPU) that is integrated into the CPU or the GPU may be a separate processor device from the CPU. The processors 402 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 402 may be configured to fetch and execute computer-readable instructions stored in the memory 404, mass storage devices 412, or other computer-readable media.

Memory 404 and mass storage devices 412 are examples of computer storage media (e.g., memory storage devices) for storing instructions that can be executed by the processors 402 to perform the various functions described herein. For example, memory 404 may include both volatile memory and non-volatile memory (e.g., RAM, ROM, or the like) devices. Further, mass storage devices 412 may include hard disk drives, solid-state drives, removable media, including external and removable drives, memory cards, flash memory, floppy disks, optical disks (e.g., CD, DVD), a storage array, a network attached storage, a storage area network, or the like. Both memory 404 and mass storage devices 412 may be collectively referred to as memory or computer storage media herein and may be any type of non-transitory media capable of storing computer-readable, processor-executable program instructions as computer program code that can be executed by the processors 402 as a particular machine configured for carrying out the operations and functions described in the implementations herein.

The computing device 400 may include one or more communication interfaces 406 for exchanging data via the network 106. The communication interfaces 406 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 406 can also provide communication with external storage, such as a storage array, network attached storage, storage area network, cloud storage, or the like.

The display device 408 may be used for displaying content (e.g., information and images) to users. Other I/O devices 410 may be devices that receive various inputs from a user and provide various outputs to the user, and may include a keyboard, a touchpad, a mouse, a printer, audio input/output devices, and so forth.

The computer storage media, such as memory 116 and mass storage devices 412, may be used to store software and data. For example, the computer storage media may be used to store the data 122, the remote PII detector 124, the dynamic dictionary 126, the remote PII remover 128, the keyword dictionary 130, other applications 414, and other data 416.

Thus, each of the computing devices 102 may have the agent 108 that gathers information (e.g., device data 110) about events occurring on the corresponding one of the computing devices 102. In some cases, the agent 108 may gather additional information, such as, for example, the software configuration, the hardware configuration, and peripherals associated with the computing device 102 and how the software applications, hardware components, and peripherals are being used. After the agent 108 has gathered the device data 110, the agent 108 may use the PII detector 112 and the PII remover 116 to remove portions of the device data 110 that potentially include PII, e.g., information that could potentially be used to identify a user of each of the computing devices 108. For example, the PII detector 112 and the PII remover 116 may remove information that may include or that may be used to determine a user name, a legal name, a password, a personal identification numbers (PIN) code, a telephone number, a street address, credit card information, insurance information, account information associated with a financial institution, social security information, or other confidential information.

After the PII has been removed from the device data 110, the agent 108 may send the data 121, e.g., one of the device data 110(1) to 110(N), to the server 104. The server 104 may perform additional PII detection using the remote PII detector 124 and remove the additional PII using the remote PII remover 128. The server 104 may dynamically update one or more dictionaries used by the PII detectors 112, 124 and/or the PII removers 116, 128 and send the updated dictionary 146 to individual ones of the computing devices 102. In this way, new words, phrases, and formats may be added to the updated dictionary 146.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   determining, by a computing device, that an event occurred on the computing device;
   determining, by the computing device, event data associated with the event;
   determining, using a first machine learning classifier being executed by the computing device, that the event data includes personally identifiable information;
   removing, using a second machine learning classifier being executed by the computing device, the personally identifiable information from the event data to create modified event data;
   storing the modified event data in a device data file that includes data associated with the computing device; and
   sending, by the computing device, the device data file to a server.

2. The method of claim 1, wherein the event comprises one of:
- input provided by a user;
- a software application installation log;
- a software application created log;
- an operating system log; or
- an operating system memory dump.

3. The method of claim 1, wherein removing the personally identifiable information from the event data to create the modified event data comprises:
- substituting a first pre-determined character for each alphabetic character in the personally identifiable information; and
- substituting a second pre-determined character for each numeric character in the personally identifiable information.

4. The method of claim 1, wherein removing the personally identifiable information from the event data to create the modified event data comprises:
- identifying a type of the personally identifiable information; and
- substituting one or more keywords describing the type.

5. The method of claim 4, wherein the type comprises one of:
- a username;
- a password;
- at least a portion of a legal name;
- at least a portion of an address;
- at least a portion of a social security number; or
- at least a portion of an account number associated with a financial institution.

6. The method of claim 1, wherein:
the first machine learning classifier comprises a Naïve Bayes classifier.

7. The method of claim 1, wherein:
the second machine learning classifier comprises a Decision Trees classifier.

8. A computing device comprising:
one or more processors; and
one or more non-transitory computer readable media storing instructions executable by the one or more processors to perform operations comprising:
- determining that an event occurred on the computing device;
- determining event data associated with the event;
- determining, using a first machine learning classifier being executed by the computing device, that the event data includes personally identifiable information;
- removing, using a second machine learning classifier being executed by the computing device, the personally identifiable information from the event data to create modified event data;
- storing the modified event data in a device data file that includes data associated with the computing device; and
- sending the device data file to a server.

9. The computing device of claim 8, the operations further comprising:
- determining that a second event occurred on the computing device;
- determining second event data associated with the second event;
- determining, using the first machine learning classifier, that the second event data includes the personally identifiable information;
- removing, using the second machine learning classifier, the personally identifiable information from the second event data to create modified second event data;
- storing the modified second event data in the device data file; and
- determining that the modified second event data is not to be sent to the server.

10. The computing device of claim 9, wherein determining that the modified second event data is not to be sent to the server comprises:
- determining that a network connection between the computing device and the server is unavailable.

11. The computing device of claim 9, wherein determining that the modified second event data is not to be sent to the server comprises:
- receiving a first instruction from the server to temporarily stop sending the device data file to the server.

12. The computing device of claim 8, the operations further comprising:
- receiving a second instruction from the server to resume sending the device data file to the server.

13. The computing device of claim 8, wherein removing the personally identifiable information from the event data to create the modified event data comprises:
- substituting a first pre-determined character for each alphabetic character in the personally identifiable information; and
- substituting a second pre-determined character for each numeric character in the personally identifiable information.

14. One or more non-transitory computer readable media storing instructions executable by one or more processors of a computing device to perform operations comprising:
- determining that an event occurred on the computing device;
- determining event data associated with the event;
- determining, using a first machine learning classifier being executed by the computing device, that the event data includes personally identifiable information;
- removing, using a second machine learning classifier being executed by the computing device, the personally identifiable information from the event data to create modified event data;
- storing the modified event data in a device data file that includes data associated with the computing device; and
- sending the device data file from the computing device to a server.

15. The one or more non-transitory computer readable media of claim 14, wherein the event comprises one of:
- input provided by a user;
- a software application installation log;
- a software application created log;
- an operating system log; or
- an operating system memory dump.

16. The one or more non-transitory computer readable media of claim 14, wherein removing the personally identifiable information from the event data to create the modified event data comprises:
- substituting a pre-determined character for each alphanumeric character in the personally identifiable information.

17. The one or more non-transitory computer readable media of claim 14, wherein removing the personally identifiable information from the event data to create the modified event data comprises:

identifying a type of the personally identifiable information; and substituting one or more keywords describing the type.

18. The one or more non-transitory computer readable media of claim 17, wherein the type comprises one of:

a username;
a password;
at least a portion of a legal name;
a password;
at least a portion of an address;
at least a portion of a social security number; or
at least a portion of an account number associated with a financial institution.

19. The one or more non-transitory computer readable media of claim 14, wherein determining that the modified second event data is not to be sent to the server comprises:

determining that a network connection between the computing device and the server is unavailable.

20. The one or more non-transitory computer readable media of claim 14, wherein determining that the modified second event data is not to be sent to the server comprises:

receiving an instruction from the server to temporarily stop sending the device data file to the server.

* * * * *